United States Patent [19]

Frister

[11] 4,241,959
[45] Dec. 30, 1980

[54] APPARATUS FOR LONG-TERM LUBRICATION OF BEARING ELEMENTS

[75] Inventor: Manfred Frister, Schwieberdingen, Fed. Rep. of Germany

[73] Assignee: Robert Bosch GmbH, Stuttgart, Fed. Rep. of Germany

[21] Appl. No.: 5,488

[22] Filed: Jan. 22, 1979

[30] Foreign Application Priority Data

Feb. 4, 1978 [DE] Fed. Rep. of Germany ....... 2804811

[51] Int. Cl.³ .............................................. F16C 33/66
[52] U.S. Cl. ................................ 308/187; 308/189 R
[58] Field of Search ...................... 308/8, 187, 107, 93, 308/122, 121, 78, 189 R; 277/134, 22

[56] References Cited

U.S. PATENT DOCUMENTS

| 1,914,498 | 6/1933 | Gardner | 308/107 |
| 3,749,459 | 7/1973 | Matuzaki et al. | 308/187 |
| 3,778,070 | 12/1973 | Shimura | 277/134 |
| 3,905,605 | 9/1975 | Hübner | 277/22 |
| 3,981,550 | 9/1976 | Zimmer et al. | 308/187 |

*Primary Examiner*—Lenard A. Footland
*Attorney, Agent, or Firm*—Frishauf, Holtz, Goodman & Woodward

[57] ABSTRACT

In order to provide long-term lubrication of bearings, especially ball or roller bearings that hold rotating shafts, there is provided a bearing housing defining internal reservoirs and passages as well as a conveyor mechanism which is attached to a part of the rotating shaft, for example as a helical conveyor screw, which transports lubricant under pressure through the internal channels, and thereby continually resupplies fresh lubricant to the rotating parts of the bearing. The apparatus may be used for holding the ends of shafts as well as for holding the intermediate portions of the shafts. Means for resupplying lubricant and expelling old lubricant are provided.

12 Claims, 2 Drawing Figures

APPARATUS FOR LONG-TERM LUBRICATION OF BEARING ELEMENTS

FIELD OF THE INVENTION

The invention relates to the lubrication of bearing elements, in particular the application of grease to roller and ball bearings in a manner which extends the time of service before relubrication is required.

BACKGROUND AND PRIOR ART

In machinery which requires lubrication and greasing for proper and continuous operation, it is necessary to perform a resupply of lubricant at periodic intervals so as to insure that the moving structural elements have a lifetime which is limited only by mechanical fatigue. In order to reduce the maintenance required for relubrication, it is known to provide ball and roller bearings with as large a reservoir of lubricant as possible. However, it has been found that only a relatively small amount of the grease from these reservoirs actually reaches the rolling tracks for the ball and roller bearings so that the desired effect is attained only to a very limited degree. Very often the grease which remains in the grease reservoir begins to harden and develops crust-like layers which contain particles that had been abraded from the bearing material and other substances which further prevent any movement of the grease in the direction of the bearing and to those points where it is most needed. Accordingly, it is possible that the moving parts of the bearing which are in rolling or gliding contact with stationary parts will receive no lubrication at all, which leads to rapid deterioration. A still further consideration is that the supply with grease is subject to temperature dependencies and that grease which is very cold is virtually incapable of migrating from the grease reservoir chambers to the races of the ball or roller bearing.

THE INVENTION

It is accordingly a principal object of the present invention to provide an apparatus for performing continuous long-term lubrication of a bearing by causing a forcible transport of grease from a reservoir chamber through the bearing. It is an associated object of the invention to provide a bearing which is continuously and optimally supplied with lubricant so that it is fully protected against friction under all circumstances including long-term operation at extremely low temperatures.

Briefly, this object is attained by providing a housing which surrounds a shaft and which defines reservoir chambers for lubricant and channels through which the lubricant may travel toward parts of the bearing. The invention further provides a forcible conveyor mechanism, powered by the rotating shaft, which forces grease through the aforementioned channels whenever the shaft rotates and thereby forces lubricant through the bearing and onto the moving parts.

It is a feature of the invention that the contacting surfaces of the ball and roller bearing elements constantly receive fresh grease so that the grease does not become embedded and stationary within the ball or roller cages as is often the case in bearings, while the balls and rollers receive very little lubricant. These events tend to occur in the known apparatus after extended periods of operation. Experiments have shown that even though the reservoirs in known bearings contain adequate amounts of lubricant, only relatively small portions thereof ever become available for lubricating the relatively moving parts so that these parts may actually run dry, leading to extremely reduced lifetimes and substantial generations of noise.

In accordance with an advantageous feature of the invention, the forcible transport of grease is powered by the rotary motions of the bearing shaft whose friction with respect to stationary portions of the machine is reduced by the presence of the ball or roller bearing. In still another feature of the invention, the bearing housing is so embodied as to define a closed circulation channel which leads directly to the moving elements of the bearing, thereby forcing lubricant directly onto the bearing elements.

The invention will now be described by way of an exemplary embodiment taken with reference to the accompanying drawing.

THE DRAWING

Figure 2:
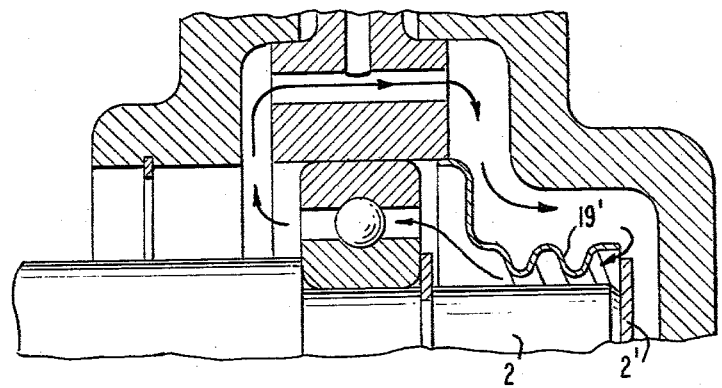
FIG. 2 is a fragmentary view of another spiral lubricant transport arrangement showing a modification.

The embodiment illustrated in the drawing is an apparatus adapted to be used with the end of a rotating shaft. It should be understood that the invention is applicable to bearings which carry shafts that extend through the bearing, as will be considered further below.

The basic principle of the present invention is to continuously force fresh lubricant into the moving parts of a bearing in which the motive power for causing the circulation of lubricant is provided by the moving bearing part. The exemplary embodiment illustrated in the figure is the application of this principle to a ball bearing holding the end of a shaft.

A rotating shaft 1 has a shoulder 2 of reduced diameter which fits the central opening of the inner ring 3 of a common ball bearing. The balls 4a circulate in known manner in concentric races which are defined jointly by grooves in the inner ring 3 and an outer ring 4. The outer ring 4 is pressed or otherwise fixedly attached to a stationary bearing element 5. The stationary element 5 has two arms or extensions 6, 7 of any suitable shape. Surrounding the bearing is a housing 8 of a generally suitable form, consisting in the exemplary embodiment shown of two housing shells 8a and 8b which are pushed sealingly onto radial surfaces on the carrier arms 6 and 7 and may be joined thereto by means of, for example, flanges 11, 12. In the embodiment shown, the housing shell 8b is closed because the bearing is intended to support the end of the shaft while the housing shell 8a has a concentric opening 13 through which the shaft 1 passes. If the apparatus of the invention were used as an intermediate bearing, the housing shell 8b would also have a central opening through which the shaft 1 would then pass. The interior space of the housing is sealed in the vicinity of the concentric opening 13 with respect to the outside by any suitable sealing material 14, for example an O-ring, an oil seal or the like, which may be held in place by a snap ring 15.

As illustrated, the interior space of the housing encloses the end of the shaft, the various parts 3, 4, 4a belonging to the bearing and parts of the stationary bearing extensions, as well as chambers for holding a sufficient amount of grease and guide channels through which the grease is forced by a grease transport mechanism which operates when the shaft rotates.

The apparatus of the invention may be used for lubricating any type of bearing, including sleeve bearings and other types of bearings but it is particularly suitable to ball or roller bearings. The guide channels for the forcible circulation of lubricant are at least partially formed by the interior walls of the housing shells 8a and 8b by so constructing these shells as to maintain a well-defined distance from internal parts of the apparatus. This construction creates spaces 16 which serve at the same time as reservoirs for lubricant. The continuous closed circulation of lubricant requires the presence of an outer return flow region as well as an inner flow region. In the exemplary embodiment illustrated, the inner flow region is also the location of the lubricant conveyor mechanism. The outer region is generally formed by the spaces 16 created through the well-defined distance of the housing shells, and also includes bores 17 through the stationary support arms 6 and 7. The inner flow channels are defined by the openings in the bearing itself and also by an adjacent partial region which is defined by the cooperation of the outside surface of a shaft extension 18 and the internal wall of a guide sleeve or bushing 19 which has a cylindrical continuation 20 that surrounds the end of the shaft 18 substantially coaxially and which is provided with a frontal cup-shaped extension 21 which mates with a front edge 22 of the stationary bearing member 5 and may be fastened there. The stationary bearing member 5 is of substantially annular shape within the interior of the bearing and is coaxial to the shaft 1 and to the bearing.

The forcible circulation of lubricant or grease is obtained by providing a worm-like conveyor structure in the vicinity of the end of the shaft 18, i.e., between the cylindrical partial region 20 of the guide sleeve or bushing 19 and the surface of the shaft. This conveyor structure may, for example, be obtained by pressing a helical spring 24 onto the end of the shaft so that, during rotations of the shaft, the grease located inside the guide bushing is caused to advance in the direction of the heavy arrows through the inner and outer guide channels. Alternatively, the conveyor mechanism may be a worm gear located within the rotating shaft cooperating with suitable stationary members. The relative motion of the worm gear 24 and the stationary parts of the bearing causes a forcible transport of the lubricant through the bearing, the speed of circulation being dependent on the pitch of the worm gear 24, the speed of the shaft etc., and being selectable to provide an optimum lubrication.

The construction according to the invention makes it possible to operate the machinery for extended periods of time without relubrication because even when the amount of lubricant is gradually reduced, the remaining lubricant is still subjected to some circulatory motion. However, relubrication may take place when needed, for example, through an inlet channel 25 provided in one of the holding arms 7. The old lubricant may be expelled from the bearing during relubrication through an outlet 26 located in the approximately opposite region of the bearing which may be closed off by a suitable stopper 27 held in the opening by a spring 28 of any suitable construction. In the exemplary embodiment shown, the spring is a leaf spring which is attached to the housing 8 at a point 29 and urges the stopper 27 to close the opening 26.

By providing forcible circulation of lubricant, the apparatus according to the invention insures long-term operation even in heavy duty service and permits very long maintenance intervals.

Figure 1:
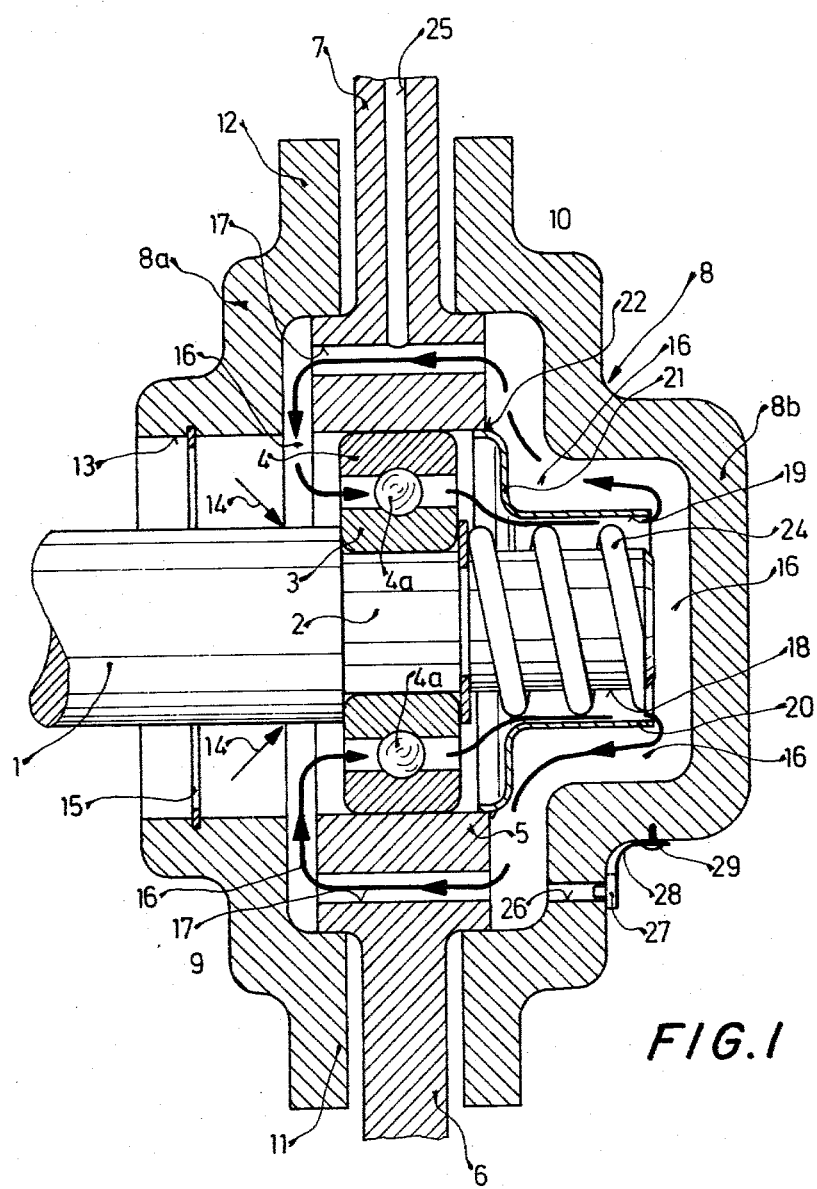
FIG. 1 is a partial sectional view of an embodiment of the invention.

Forcible circulation of lubricant can also be accomplished by forming a spiral groove in the sleeve 19 and placing an inclined plate at the end of shaft 2, the groove within sleeve 19 providing for transport of lubricant axially with respect to the shaft. This groove can be formed, for example, by deformation of the sleeve 19' to form, in cross section, alternating undulation or, if the material of sleeve 19' is thick enough, by cuts or grooves therein, leaving adjacent spiral ridges. The lubricant can be supplied by an inclined end plate 2', secured to shaft 2, resulting in a reversed fluid circuit from that shown in connection with FIG. 1, as illustrated in FIG. 2.

Various changes and modifications may be made within the scope of the inventive concept.

I claim:

1. An apparatus for providing long-term lubrication of a bearing, comprising
    a bearing (3, 4, 4a) for holding and locating a rotating shaft;
    a housing formed by two concentric shells (8a, 8b) surrounding said bearing and having at least one opening for receiving said shaft, said housing defining internal reservoir spaces (16, 17) for holding lubricant;
    a lubricant guide sleeve (19) attached to a stationary part of said bearing and coaxially surrounding a part of said shaft (18) with clearance, thereby defining a guide channel for said lubricant;
    and a conveyor mechanism coupled to and powered by said rotating shaft, for imparting motion to said lubricant, located in the space defined between said guide sleeve (19) and the outer surface (18) of said shaft to circulate lubricant through said bearing and through said reservoir spaces.

2. An apparatus according to claim 1, wherein the internal reservoir spaces (16, 17) define outer return channels and wherein axial openings in said bearing define admission channels for the lubricant.

3. An apparatus according to claim 2, wherein the outer return flow channels are defined by the separation of the internal surfaces of said housing shells from said bearing (3, 4, 4a).

4. An apparatus according to claim 1, wherein said guide sleeve has a radially enlarged region (21) which is placed in sealing contact with an annular surface of a stationary member (5) which receives a stationary bearing part (4) of said bearing (3, 4, 4a).

5. An apparatus according to claim 1, further comprising sealing means (14) disposed between said shaft (1) and at least one of said housing shells (8a, 8b) for sealing the interior volume of said housing with respect to the outside and preventing the passage of lubricant therefrom.

6. An apparatus according to claim 1, wherein said conveyor mechanism includes a helical screw member (24) coaxially surrounding said shaft (18) immediately adjacent to the position of a movable part (3) of said bearing (3, 4, 4a).

7. An apparatus according to claim 6, wherein said helical screw mechanism is a helical spring.

8. An apparatus according to claim 6, wherein said helical screw mechanism is an external helical thread provided on the end (18) of said shaft.

9. An apparatus according to claim 1, further comprising passages (17) within a stationary member (5)

which holds a stationary part (4) of said bearing (3, 4, 4a) and an inlet channel (25) for permitting the resupply of lubricant to the interior of said housing.

10. An apparatus according to claim 9, further comprising an outlet opening (26) for permitting excess lubricant to emerge from said housing during relubrication, and a spring-loaded stopper (27) for closing off the opening (26).

11. An apparatus according to claim 1, further comprising a stationary member (5) having a central opening for holding a stationary part (4) of said bearing (3, 4, 4a) and being provided with extensions (6, 7) to which portions of said housing shells (8a, 8b) may be attached.

* * * * *